(12) United States Patent
Prabhudharwadkar et al.

(10) Patent No.: US 11,047,265 B1
(45) Date of Patent: Jun. 29, 2021

(54) SYSTEMS AND METHODS FOR OPERATING A TURBOCHARGED GAS TURBINE ENGINE

(71) Applicant: General Electric Company, Schenectady, NY (US)

(72) Inventors: Deoras Prabhudharwadkar, Dubai (AE); Jalal Hunain Zia, Niskayuna, NY (US); Majed Sammak, Dammam (SA)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/731,606

(22) Filed: Dec. 31, 2019

(51) Int. Cl.
| | | |
|---|---|---|
| *F01K 23/10* | (2006.01) | |
| *F01D 25/12* | (2006.01) | |
| *F02C 6/00* | (2006.01) | |
| *F02C 6/12* | (2006.01) | |

(52) U.S. Cl.
CPC .......... *F01K 23/10* (2013.01); *F01D 25/12* (2013.01); *F02C 6/00* (2013.01); *F02C 6/12* (2013.01)

(58) Field of Classification Search
CPC .... F01K 23/10; F02C 6/12; F02C 6/00; F01D 25/12
USPC .......................................... 60/39.182, 39.183
See application file for complete search history.

(56) References Cited

U.S. PATENT DOCUMENTS

| | | | | |
|---|---|---|---|---|
| 3,971,211 | A * | 7/1976 | Wethe .................... | F01K 7/32 60/39.181 |
| 5,488,823 | A * | 2/1996 | Faulkner ................. | F02C 3/22 60/783 |
| 7,934,383 | B2 * | 5/2011 | Gutierrez ............... | F01K 23/068 60/780 |
| 9,341,084 | B2 | 5/2016 | Xie et al. | |
| 9,540,999 | B2 | 1/2017 | Stapp | |
| 10,047,671 | B2 | 8/2018 | Allam et al. | |
| 10,101,092 | B2 | 10/2018 | Stapp et al. | |
| 2005/0172639 | A1 * | 8/2005 | Yamanaka ............... | F02C 3/20 60/780 |
| 2015/0361877 | A1 * | 12/2015 | Gulen ..................... | F02B 73/00 123/2 |

(Continued)

FOREIGN PATENT DOCUMENTS

| | | |
|---|---|---|
| EP | 3109433 A1 | 12/2016 |
| EP | 3255263 A1 | 12/2017 |
| WO | 2016039655 A1 | 5/2017 |

OTHER PUBLICATIONS

Extended European Search Report for Application EP 20214759.1 dated Apr. 23, 2021; 7 pp.

*Primary Examiner* — Hoang M Nguyen
(74) *Attorney, Agent, or Firm* — Armstrong Teasdale LLP

(57) ABSTRACT

A power generation system includes a combustion system, a turbocharger, and a heat recovery system. The combustion system is configured to combust a fuel with a flow of air. The combustion system is further configured to generate an exhaust stream. The turbocharger is configured to compress a flow of compressed air and to channel the flow of compressed air to the combustion system. The combustion system is configured to combust the fuel with the flow of compressed air and an additional flow of air. The heat recovery system is configured to recover heat from the exhaust stream and to drive the turbocharger. The heat recovery system uses a supercritical working fluid to absorb heat from the exhaust stream and to drive the turbocharger.

20 Claims, 5 Drawing Sheets

(56) References Cited

U.S. PATENT DOCUMENTS

2017/0101931 A1    4/2017   Armstrong et al.
2017/0356340 A1   12/2017   Vaisman et al.
2019/0195121 A1    6/2019   Homison et al.

* cited by examiner

SYSTEMS AND METHODS FOR OPERATING A TURBOCHARGED GAS TURBINE ENGINE

BACKGROUND

The field of the disclosure relates generally to gas turbine engines and, more specifically, to systems and methods for operating a turbocharged gas turbine engine.

Gas turbine engines typically include at least one compressor, at least one burner, and at least one turbine arranged in a serial flow configuration. Typically, the compressor channels compressed air to the burner where it is mixed with a flow of fuel and combusted, creating a high temperature flow of combustion gases that are channeled toward the turbine prior to being exhausted from the gas turbine engine. However, in high elevation regions or high ambient temperature regions, where the air has less density than lower elevation regions or low ambient temperature regions, less air is compressed, and the gas turbine engine produces less power because the lower density air combusts less fuel.

To overcome the shortage created at higher elevations and high ambient temperature regions, at least some known gas turbine engines include a turbocharger to facilitate increasing the volume of compressed air channeled to the burner. However, turbocharges use power generated by the gas turbine engine to compress additional air for combustion, thus decreasing the efficiency of the gas turbine engine. To partially offset power consumed by the turbocharger, at least some known gas turbine engines include a heat recovery system that recovers heat from the exhaust of the gas turbine engine that is channeled to the turbocharger. Heat recovery systems typically use water and/or steam as a working fluid, however, such systems generally consume large volumes of water during operation. Additionally, the water used as the working fluid is treated for impurities to avoid oxidation and scaling in the heat recovery system, and, as such, heat recovery systems using water and/or steam as the working fluid typically require water treatment systems. As a result, the use of turbochargers in higher elevation, high ambient temperature, and/or arid locations may be limited if such turbines are located in regions that do not have enough water to support a heat recovery system. It would therefore be desirable to provide a gas turbine engine with a turbocharger that includes a heat recovery system that uses a fluid other than water as the working fluid.

BRIEF DESCRIPTION

In one aspect, a power generation system is provided. The power generation system includes a combustion system, a turbocharger, and a heat recovery system. The combustion system is configured to combust a fuel with a flow of air. The combustion system is further configured to generate an exhaust stream. The turbocharger is configured to compress a flow of compressed air and to channel the flow of compressed air to the combustion system. The combustion system is configured to combust the fuel with the flow of compressed air and an additional flow of air. The heat recovery system is configured to recover heat from the exhaust stream and to drive the turbocharger. The heat recovery system uses a supercritical working fluid to absorb heat from the exhaust stream and to drive the turbocharger.

In another aspect, a method of generating power using a power generation system is provided. The power generation system includes a combustion system, a heat recovery system, and a turbocharger. The method includes combusting a fuel with a flow of air to generate power and an exhaust stream using the combustion system. The method also includes channeling the exhaust stream from the combustion system to the heat recovery system. The method further includes heating a supercritical working fluid within the heat recovery system using the exhaust stream. The method also includes driving the turbocharger using the supercritical working fluid. The method further includes compressing a flow of compressed air using the turbocharger. The method also includes combusting the fuel with the flow of compressed air and an additional flow of air to generate power and the exhaust stream.

In another aspect, a heat recovery system for a power generation system is provided. The heat recovery system includes at least one heat exchanger configured to receive an exhaust stream from a combustion system. The at least one heat exchanger is configured to transfer heat from the exhaust stream to a supercritical working fluid. The heat recovery system also includes at least one turbine coupled to at least one turbocharger. The at least one turbine is configured to receive the supercritical working fluid from the at least one heat exchanger. The at least one turbine is configured to extract useable work from the supercritical working fluid to drive the at least one turbocharger.

DRAWINGS

These and other features, aspects, and advantages of the present disclosure will become better understood when the following detailed description is read with reference to the accompanying drawings in which like characters represent like parts throughout the drawings, wherein.

Figure 1:
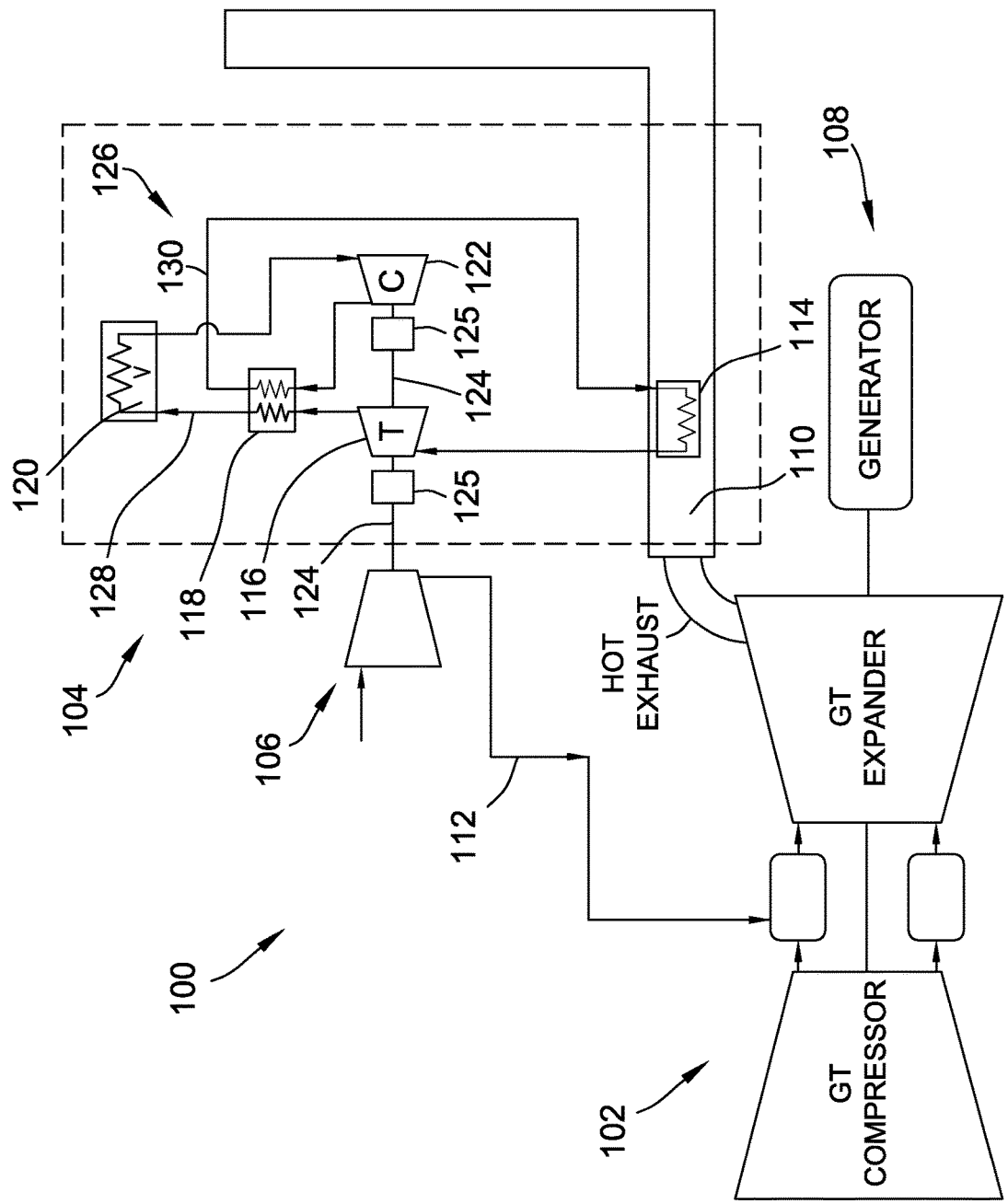
FIG. 1 is a block flow diagram of an exemplary power generation system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item. As used herein, the term "couple" is not limited to a direct mechanical, thermal, electrical, and/or flow communication connection between components, but may also include an indirect mechanical, thermal, electrical, and/or flow communication connection between multiple components.

As used herein, the terms "axial" and "axially" refer to directions and orientations extending substantially parallel to a longitudinal axis of a rotary machine. Moreover, the terms "radial" and "radially" refer to directions and orientations extending substantially perpendicular to the longitudinal axis of the rotary machine. In addition, as used herein, the terms "circumferential" and "circumferentially" refer to directions and orientations extending arcuately about the longitudinal axis of the rotary machine. Further, as used herein, the term "upstream" refers to a forward or inlet end of a rotary machine, and the term "downstream" refers to an aft or exhaust end of the rotary machine.

The systems described herein relate to power generation systems that may be used in high elevation and/or high ambient temperature regions. Specifically, the power generation systems described herein each include a gas turbine engine, a heat recovery system, a turbocharger, and a generator. The gas turbine engine combusts a fuel and generates an exhaust stream. The exhaust stream is channeled to the heat recovery system, and the heat is recovered from the exhaust stream for use in powering the turbocharger. The turbocharger channels a flow of compressed air to the gas turbine engine where the flow of compressed air is mixed and combusted with the fuel to increase the power output and the efficiency of the gas turbine engine.

In the exemplary embodiment, the power generation system is located at a high elevation and/or a high ambient temperature location, and, as such, the air that the gas turbine engine uses to combust the fuel has a lower density than air at lower elevation locations or lower ambient temperature regions. Because the air is less dense, the gas turbine engine produces less power as compared to gas turbine engines at lower elevation locations or lower ambient temperature regions. The turbocharger increases the flow of air for combustion into the gas turbine engine and increases the overall power generation of the gas turbine engine. Additionally, because the heat recovery system drives the turbocharger with heat recovered from the exhaust stream, the power produced by the power generation system is increased without decreasing the efficiency. Moreover, in the exemplary embodiment, the working fluid, i.e. the fluid used to convert heat to usable energy, is supercritical $CO_2$, and, as such, the heat recovery system is not a water intensive system. Accordingly, the power generation system increases the power generation and efficiency of the gas turbine engine while decreasing water consumption when the power generation system is located in higher altitude and/or arid regions.

FIG. 1 is a block flow diagram of an exemplary power generation system 100 including a gas turbine engine 102, a heat recovery system 104, a turbocharger 106, and a generator 108. In the exemplary embodiment, gas turbine engine 102 generates power by combusting a fuel to generate a exhaust stream 110. Exhaust stream 110 is channeled to heat recovery system 104, and heat recovery system 104 recovers heat from exhaust stream 110 to power turbocharger 106. Turbocharger 106 channels a flow of compressed air 112 to gas turbine engine 102, and gas turbine engine 102 combusts the flow of compressed air 112 with the fuel to increase the power output and the efficiency of gas turbine engine 102.

Figure 2:
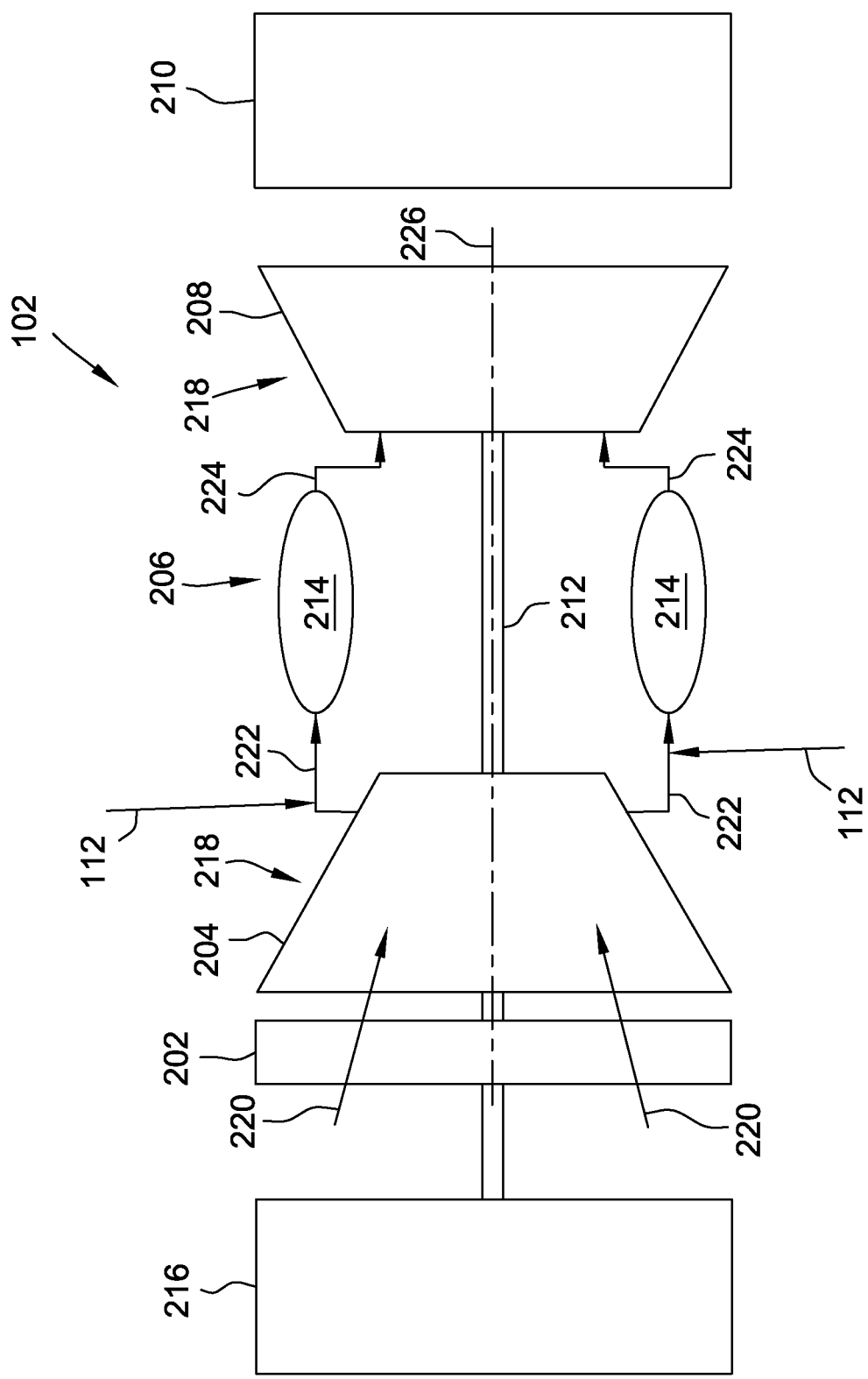
FIG. 2 is a schematic view of an exemplary combustion system that may be used with the power generation system shown in FIG. 1.

In the exemplary embodiment, gas turbine engine 102 is a gas turbine engine. Alternatively, gas turbine engine 102 may be any other turbine engine and/or rotary machine, including, without limitation, a steam turbine engine, a gas turbofan aircraft engine, other aircraft engine, a wind turbine, a compressor, and/or a pump. FIG. 2 is an enlarged schematic view of gas turbine engine 102. In the exemplary embodiment, gas turbine engine 102 includes an intake section 202, a compressor section 204 that is downstream from intake section 202, a combustor section 206 that is downstream from compressor section 204, a turbine section 208 that is downstream from combustor section 206, and an exhaust section 210 that is downstream from turbine section 208. Turbine section 208 is coupled to compressor section 204 via a rotor shaft 212.

In the exemplary embodiment, combustor section 206 includes a plurality of combustors 214 and a plurality of fuel nozzles (not shown). Combustor section 206 is coupled to compressor section 204 such that each combustor 214 is in flow communication with compressor section 204. Rotor shaft 212 is also coupled to a load 216 such as, but not limited to, an electrical generator and/or a mechanical drive application. In the exemplary embodiment, each compressor section 204 and each turbine section 208 includes at least one rotor assembly 218 that is coupled to rotor shaft 212.

In operation, intake section 202 channels air 220 from the atmosphere and air 112 from turbocharger 106 towards compressor section 204. Compressor section 204 compresses inlet air 220 to higher pressures prior to discharging compressed air 222 towards combustor section 206. Compressed air 222 from compressor section 204 is mixed with compressed air 112 from turbocharger 106, and the mixture is channeled to combustor section 206 where it is mixed with fuel and burned to generate high temperature combustion gases 224. More specifically, fuel is channeled at a high pressure to the fuel nozzles. The fuel nozzles atomize the fuel such that the atomized fuel mixes with compressed air 222. Combustion gases 224 are channeled downstream towards turbine section 208 to impinge upon turbine blades (not shown) that convert thermal energy to mechanical rotational energy used to drive rotor assembly 218 about a longitudinal axis 226. Often, combustor section 206 and turbine section 208 are referred to as a hot gas section of gas turbine engine 102. Exhaust stream 110 is then discharged through exhaust section 210 to heat recovery system 104. Rotor assembly 218 is coupled to generator 108 that generates power.

During operation of power generation system 100, exhaust stream 110 from gas turbine engine 102 is channeled to heat recovery system 104. Once gas turbine engine 102 has achieved a minimum operating load, turbocharger 106 begins generating compressed air 112 and channeling the compressed air 112 to gas turbine engine 102. That is, once the temperature of the exhaust gases is high enough to power turbocharger 106, turbocharger 106 begins compressing air and channeling the air to gas turbine engine 102. Gas turbine engine 102 then begins producing additional power with a higher efficiency.

As shown in FIG. 1, heat recovery system 104 includes a heat exchanger 114, a turbine 116, a recuperator 118, a cooler 120, and a compressor 122. Turbine 116 is coupled to turbocharger 106 and compressor 122 by a shaft 124. In an alternative embodiment, turbine 116 may be coupled to turbocharger 106 and compressor 122 by shaft 124 and at least one gearbox 125 configured to control a speed of turbocharger 106 and/or compressor 122. Additionally, in another alternative embodiment, turbine 116 may be coupled to turbocharger 106 and compressor 122 by different shafts 124. Heat exchanger 114, turbine 116, recuperator 118, cooler 120, and compressor 122 form a closed loop circuit 126 that enables a working fluid to be channeled around closed loop circuit 126 to power turbocharger 106. More specifically, closed loop circuit 126 (1) transfers heat from exhaust stream 110 to the working fluid, (2) drives turbine 116 with heat within in the working fluid, and (3) drives turbocharger 106 with turbine 116.

Heat exchanger 114 transfers heat from exhaust stream 110 to the working fluid to drive turbine 116. Heat exchanger 114 includes at least one heat exchanger that transfers heat from exhaust stream 110 to the working fluid. In alternative embodiments, heat exchanger 114 includes a plurality of heat exchangers that transfer heat from exhaust stream 110 to the working fluid. In the exemplary embodiment, heat exchanger 114 includes a shell and tube heat exchanger. In alternative embodiments, heat exchanger 114 may be any other type of heat exchanger that enables heat recovery system 104 to operate as described herein, including, without limitation, plate and frame heat exchangers and/or double pipe heat exchangers.

Turbine 116 extracts energy from exhaust stream 110 to drive turbocharger 106 and compressor 122. More specifically, turbine 116 extracts energy from exhaust stream 110 to drive shaft 124, which, in turn, drives turbocharger 106 and compressor 122. Turbine 116 includes at least one turbine that extracts heat from exhaust stream 110. In alternative embodiments, turbine 116 includes a plurality of turbines that extract heat from exhaust stream 110. In the exemplary embodiment, turbine 116 includes any rotary machine that extracts energy from a fluid and that converts the extracted energy into useful work. In alternative embodiments, turbine 116 may be any device that enables heat recovery system 104 to operate as described herein.

Recuperator 118 transfers heat from a discharge 128 of turbine 116 to a discharge 130 of compressor 122 to recover additional heat from the working fluid and to increase the efficiency of power generation system 100. In the exemplary embodiment, recuperator 118 includes at least one heat exchanger that transfers heat from discharge 128 of turbine 116 to discharge 130 of compressor 122. In alternative embodiments, recuperator 118 includes a plurality of heat exchangers that transfer heat from discharge 128 of turbine 116 to discharge 130 of compressor 122. In the exemplary embodiment, recuperator 118 includes a shell and tube heat exchanger. In alternative embodiments, recuperator 118 may be any other type of heat exchanger that enables heat recovery system 104 to operate as described herein, including, without limitation, plate and frame heat exchangers and/or double pipe heat exchangers.

Cooler 120 transfers heat from the working fluid to cool the working fluid prior to compression by compressor 122. Cooler 120 includes at least one heat exchanger that cools the working fluid. In alternative embodiments, cooler 120 includes a plurality of heat exchangers that cool the working fluid. In the exemplary embodiment, cooler 120 includes a shell and tube heat exchanger that exchanges heat from the working fluid to a cooling fluid. In alternative embodiments, cooler 120 may be any other type of heat exchanger that enables heat recovery system 104 to operate as described herein, including, without limitation, plate and frame heat exchangers and double pipe heat exchangers. In the exemplary embodiment, the cooling fluid is water, air, a combination of water and air, and/or any other cooling fluid that enables cooler 120 to operate as described herein.

Compressor 122 increases a pressure of the working fluid to provide the motive force to channel the working fluid around closed loop circuit 126. Compressor 122 includes at least one compressor that increases the pressure of the working fluid. In alternative embodiments, compressor 122 includes a plurality of compressors that increase the pressure of the working fluid. In the exemplary embodiment, compressor 122 includes any rotary machine that increases the pressure of a fluid, including a centrifugal compressor. In alternative embodiments, compressor 122 may be any other device that enables heat recovery system 104 to operate as described herein.

In the exemplary embodiment, the working fluid is a supercritical fluid. More specifically, in the exemplary embodiment, the working fluid is supercritical carbon dioxide ($sCO_2$). In alternative embodiments, the working fluid may be any other supercritical fluid that enables heat recovery system 104 to operate as described herein. Additionally, the working fluid may be any other fluid that enables heat recovery system 104 to operate as described herein, including, without limitation, steam, air, and/or liquid water. In the exemplary embodiment, a supercritical fluid is a substance having a temperature and pressure above the substance's critical point. When a substance is a supercritical fluid, the distinction between a vapor phase and a liquid phase of the substance disappears, and the density of the substance typically increases. Additionally, when a substance is a supercritical fluid small changes in temperature and pressure can produce large changes in the density of the substance, enabling tuning of the properties of the substance. As described above, in the exemplary embodiment the working fluid is $sCO_2$. $sCO_2$ has density that is approximately three times the density of steam, and, as such, $sCO_2$ can absorb more heat per volume than steam. Accordingly, equipment within heat recovery system 104, including heat exchanger 114, turbine 116, recuperator 118, cooler 120, and compressor 122, are more compact than equipment that use steam as a working fluid, and heat recovery system 104 is not a water intensive system. Accordingly, $sCO_2$ facilitates increasing the power generation and efficiency of gas turbine engine 102, decreasing the size of equipment within heat recovery system 104, and decreasing the water consumption of heat recovery system 104 when power generation system 100 is located in higher altitude and/or arid regions.

Turbocharger 106 compresses air and channels the compressed air to gas turbine engine 102 to provide additional air for combustion and to increase the efficiency of gas turbine engine 102. Turbocharger 106 includes at least one compressor that compresses air and channels the compressed air to gas turbine engine 102. In alternative embodiments, turbocharger 106 includes a plurality of compressors that compress air and channel the compressed air to gas turbine engine 102. In the exemplary embodiment, turbocharger 106 includes any rotary machine that compresses air, including a centrifugal compressor. In alternative embodiments, turbocharger 106 may be any other device that enables power generation system 100 to operate as described herein.

Generator 108 generates power from rotational energy provided by gas turbine engine 102. More specifically, generator 108 includes a rotor (not shown) including a plurality of magnets (not shown), a stator (not shown) surrounding the rotor, and a plurality of windings (not shown). Rotation of the rotor induces an electric current in the windings which generates power. Generator 108 includes at least one generator that generates power. In alternative embodiments, generator 108 includes a plurality of generators that generate power. In alternative embodiments, generator 108 may be any device that enables power generation system 100 to operate as described herein.

During operation of power generation system 100, gas turbine engine 102 combusts fuel and air from compressor section 204 and turbocharger 106 to rotate generator 108, which generates power. Exhaust stream 110 is channeled from gas turbine engine 102 to heat exchanger 114. Heat exchanger 114 transfers heat from exhaust stream 110 to the working fluid and channels the working fluid to turbine 116. Turbine 116 extracts energy from the working fluid and drives turbocharger 106 and compressor 122. Discharge 128 of turbine 116 is channeled to recuperator 118 where recuperator 118 transfers heat from discharge 128 of turbine 116 to discharge 130 of compressor 122. The working fluid is then channeled to cooler 120 which cools the working fluid prior to compression with compressor 122. The working fluid is then channeled to compressor 122, and compressor 122 compresses the working fluid and channels the working fluid to recuperator 118. Recuperator 118 transfers heat from discharge 128 of turbine 116 to discharge 130 of compressor 122. The working fluid is finally channeled back to heat exchanger 114 to complete closed loop circuit 126. Turbocharger 106 compresses air and channels the compressed air to gas turbine engine 102 where it is combusted to generate power.

Accordingly, power generation system 100 generates power in higher elevation locations and/or higher ambient temperature regions with a compact footprint and using a system that is not water intensive. More specifically, when power generation system 100 is located at a higher elevation location and/or a higher ambient temperature region, the air that gas turbine engine 102 used to combust the fuel has a lower density than air at lower elevation and/or lower ambient temperature locations. Turbocharger 106 increases the flow of air for combustion into gas turbine engine 102 and increases the overall power generation of gas turbine engine 102. Additionally, because heat recovery system 104 powers turbocharger 106 with heat recovered from exhaust stream 110, power produced by power generation system 100 is increased without a decrease in turbine efficiency. Moreover, the working fluid is supercritical $CO_2$, and, as such, heat recovery system 104 is not a water intensive system. Accordingly, power generation system 100 increases the power generation and efficiency of gas turbine engine 102 and decreases the water consumption of heat recovery system 104 when power generation system 100 is located in higher altitude and/or arid regions.

Figure 3:
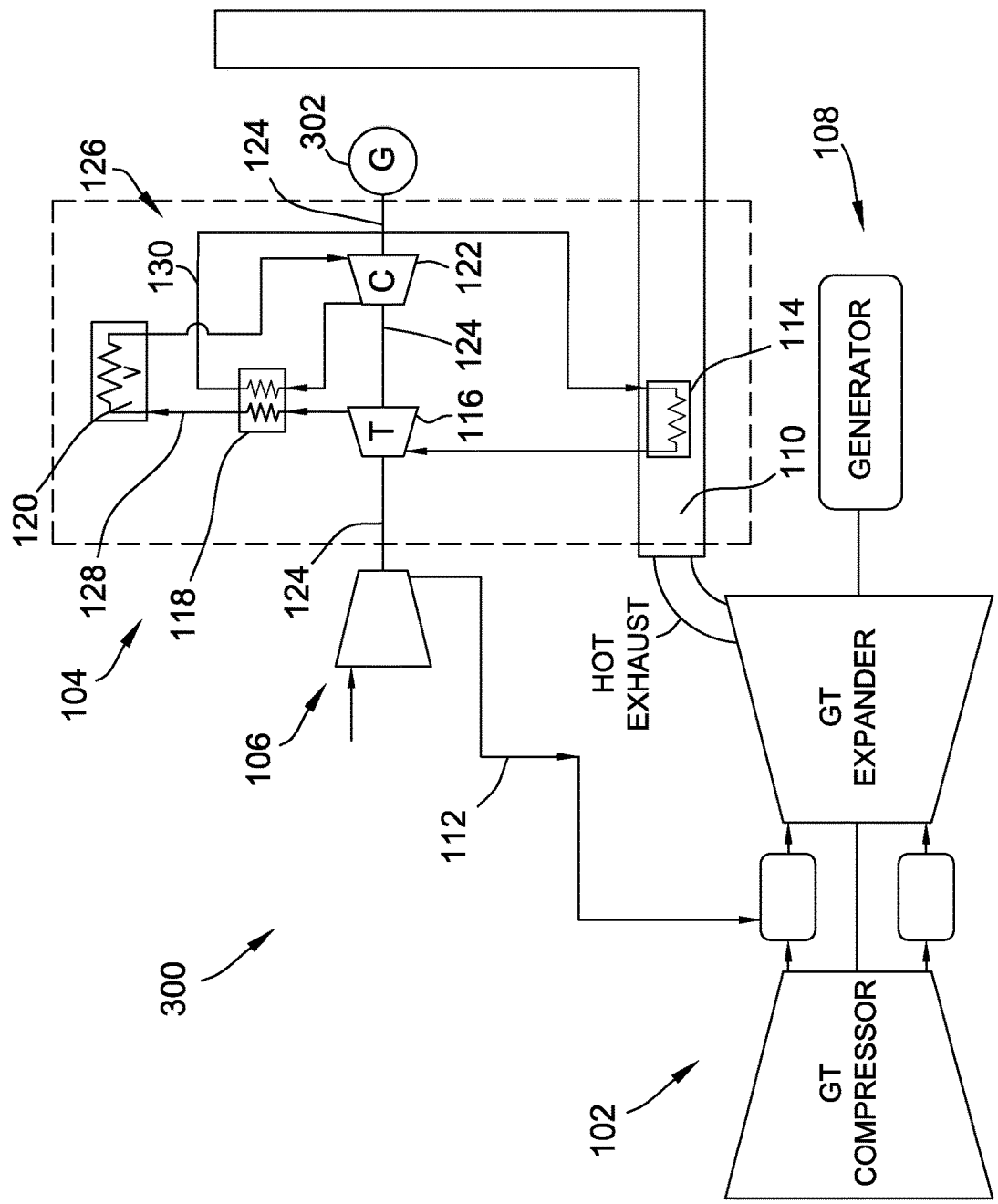
FIG. 3 is a block flow diagram of an alternative power generation system.

FIG. 3 is a block flow diagram of another exemplary power generation system 300. Power generation system 300 is substantially similar to power generation system 100 except power generation system 300 also includes an auxiliary generator 302 coupled to shaft 124. In the exemplary embodiment, shaft 124 drives turbocharger 106, compressor 122, and auxiliary generator 302. Accordingly, more useable work is extracted from the working fluid by turbine 116 and that work generates power which supplements the power produced by gas turbine engine 102. Furthermore, where the flow of compressed air 112 that can be injected into gas turbine engine 102 is limited due to the gas turbine engine's 102 mechanical limits, the heat harnessed from the exhaust of gas turbine engine 102 is converted directly into additional electrical output on the same shaft 124. As such, auxiliary generator 302 increases the overall power generated by power generation system 300 and increases the efficiency of power generation system 300.

Figure 4:
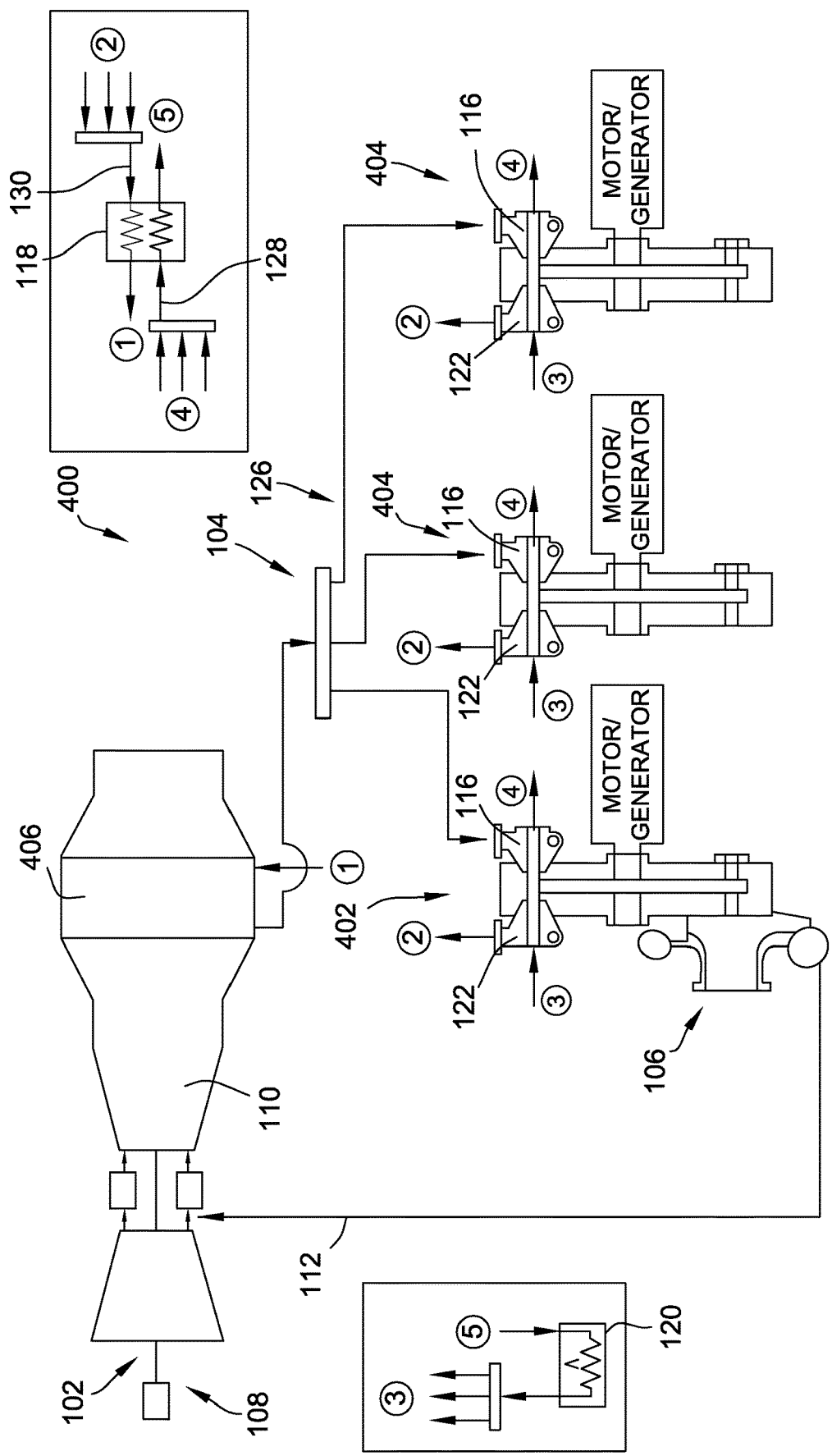
FIG. 4 is a block flow diagram of a further alternative power generation system.

FIG. 4 is a block flow diagram of another exemplary power generation system 400. Power generation system 400 is substantially similar to power generation system 100 except power generation system 400 includes at least one first turbomachine 402, at least one second turbomachine 404, and a heat exchanger 406 coupled to exhaust section 110 of gas turbine engine 102. In the exemplary embodiment, power generation system 400 may include a plurality of first turbomachines 402 and a plurality of second turbomachines 404. In the illustrated embodiment, power generation system 400 includes a single first turbomachine 402 and two second turbomachines 404. However, power generation system 400 may include any number of turbomachines 402 and 404 that enables power generation system 400 to operate as described herein.

First turbomachines 402 are rotating machinery that combines the functionality of turbocharger 106, turbine 116, compressor 122, and auxiliary generator 302. That is, first turbomachine 402 includes turbocharger 106, turbine 116, compressor 122, and auxiliary generator 302 in a single unit. Because first turbomachine 402 includes turbocharger 106, its primary function is to drive turbocharger 106 using turbine 116. As such, in an alternative embodiment, first turbomachine 402 may include only turbocharger 106 and turbine 116 in a single unit. In a further alternative embodiment, first turbomachine 402 may include only turbocharger 106, turbine 116, and auxiliary generator 302 in a single unit. In yet another alternative embodiment, first turbomachine 402 may include only turbocharger 106, turbine 116, and compressor 122 in a single unit.

Second turbomachines 404 are rotating machinery that combines the functionality of turbine 116, compressor 122, and auxiliary generator 302. That is, second turbomachine 404 includes turbine 116, compressor 122, and auxiliary generator 302 in a single unit. Because second turbomachine 404 does not include turbocharger 106, its primary function is to drive compressor 122 using turbine 116 and convert the net surplus energy into electrical output. As such, in an alternative embodiment, second turbomachine 404 may also include only turbocharger 106 and compressor 122 in a single unit. Heat exchanger 406 is coupled directly to exhaust section 210 of gas turbine engine 102, increasing the efficiency of heat exchanger 406 and reducing the footprint of power generation system 400.

Power generation system 400 has an efficiency greater than power generation system 100 because heat exchanger 406 is coupled directly to exhaust section 110 of gas turbine engine 102 and first turbomachine 402 drives turbocharger 106 while second turbomachine 404 drives compressor 122. Separating the drive of turbocharger 106 and compressor 122 increases the efficiency of power generation system 400. Accordingly, more useable work is extracted from the working fluid by first turbomachine 402 and second turbomachine 404, increasing the efficiency of power generation system 400. As such, the orientation of heat exchanger 406, first turbomachine 402, and second turbomachine 404 facilitates increasing the overall power generated by power generation system 400 and facilitates increasing the efficiency of power generation system 400.

Figure 5:
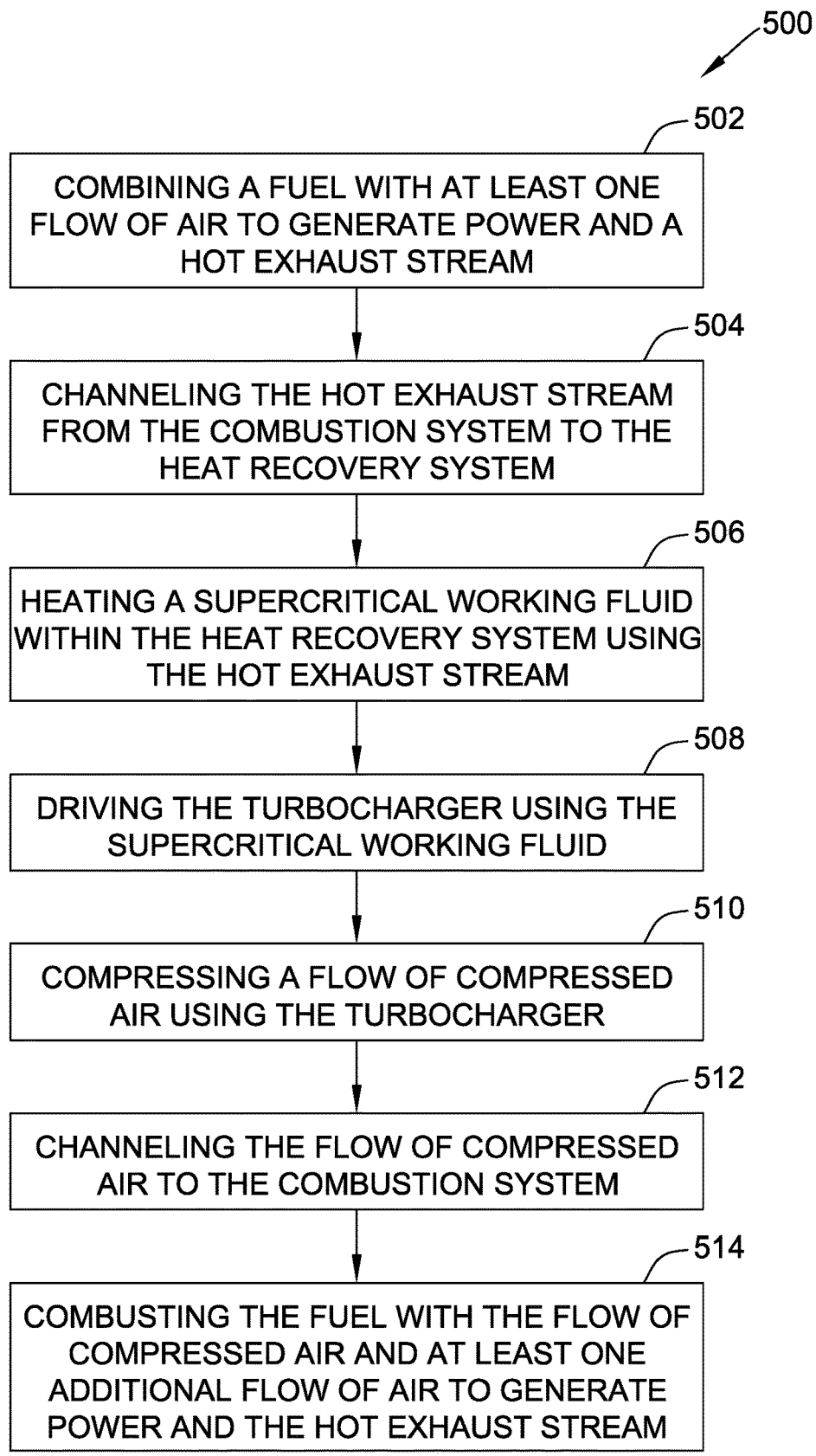
FIG. 5 is a flow diagram of an exemplary method of generating power using the power generation system of FIGS. 1, 3, and 4.

FIG. 5 is a flow diagram of an exemplary method 500 of generating power using a power generation system (shown in FIG. 1). The power generation system includes a combustion system, a heat recovery system, and a turbocharger. Method 500 includes combusting 502 a mixed fuel to generate power and an exhaust stream. Additionally, method 500 also includes channeling 504 the exhaust stream from the combustion system to the heat recovery system. Furthermore, method 500 also includes heating 506 a supercritical working fluid within the heat recovery system using the exhaust stream. Moreover, method 500 also includes driving 508 the turbocharger using the supercritical working fluid. Method 500 further includes compressing 510 a flow of compressed air using the turbocharger. Method 500 also includes channeling 512 the flow of compressed air to the combustion system. Finally, method 500 also includes combusting 514 the fuel with the flow of compressed air and at least one additional flow of air to generate power and the exhaust stream.

The above described power generation systems may be used efficiently in higher elevation regions and/or higher ambient temperature regions. Specifically, the power generation systems described herein each include a gas turbine engine, a heat recovery system, a turbocharger, and a generator. The gas turbine engine combusts a fuel and generates an exhaust stream. The exhaust stream is channeled to the heat recovery system, and the heat is recovered from the exhaust stream for use in powering the turbocharger. The turbocharger channels a flow of compressed air to the gas turbine engine where the flow of compressed air is mixed and combusted with the fuel to increase the power output and the efficiency of the gas turbine engine.

In the exemplary embodiment, the power generation system is located at high elevation and/or higher ambient temperature locations, and, as such, the air that the gas turbine engine uses to combust the fuel has a lower density than air at lower elevation and/or lower ambient temperature locations. Because the air is less dense, the gas turbine engine produces less power as compared to gas turbine engines at lower elevation and/or lower ambient temperature locations. The turbocharger increases the flow of air for combustion into the gas turbine engine and increases the overall power generation of the gas turbine engine. Additionally, because the heat recovery system drives the turbocharger with heat recovered from the exhaust stream, the power produced by the power generation system is increased without decreasing the efficiency. Moreover, in the exemplary embodiment, the working fluid, i.e. the fluid used to convert heat to usable energy, is supercritical $CO_2$, and, as such, the heat recovery system is not a water intensive system. Accordingly, the power generation system increases the power generation and efficiency of the gas turbine engine while decreasing water consumption when the power generation system is located in higher altitude, higher temperature, and/or arid regions.

Additionally, an exemplary technical effect of the systems and methods described herein includes at least one of: (a) driving a turbocharger using a turbine power by a supercritical working fluid; (b) recovering heat from an exhaust stream using a heat recovery system; and (c) operating a combustion system using compressed air from a turbocharger.

Exemplary embodiments of systems and methods for generating power are described above in detail. The methods and systems are not limited to the specific embodiments described herein, but rather, components of systems and/or steps of the methods may be utilized independently and separately from other components and/or steps described herein. For example, the method may also be used in combination with other power generation system, and are not limited to practice only with the other power generation system as described herein. Rather, the exemplary embodiment can be implemented and utilized in connection with many other power generation applications.

Although specific features of various embodiments of the present disclosure may be shown in some drawings and not in others, this is for convenience only. In accordance with the principles of embodiments of the present disclosure, any feature of a drawing may be referenced and/or claimed in combination with any feature of any other drawing.

This written description uses examples to disclose the embodiments of the present disclosure, including the best mode, and also to enable any person skilled in the art to practice embodiments of the present disclosure, including making and using any devices or systems and performing any incorporated methods. The patentable scope of the embodiments described herein is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power generation system comprising:
   a combustion system configured to combust a fuel with a flow of air, said combustion system further configured to generate an exhaust stream;
   a turbocharger configured to compress a flow of compressed air and to channel the flow of compressed air to said combustion system, wherein said combustion system is configured to combust the fuel with the flow of compressed air and an additional flow of air; and
   a heat recovery system configured to recover heat from the exhaust stream and to drive said turbocharger, wherein said heat recovery system uses a supercritical working fluid to absorb heat from the exhaust stream, prior to the heated supercritical working fluid driving said turbocharger.

2. The power generation system of claim 1, wherein said combustion system comprises a gas turbine engine.

3. The power generation system of claim 1, further comprising a generator coupled to said combustion system, wherein said generator is configured to generate power.

4. The power generation system of claim 1, wherein said heat recovery system comprises:
   at least one heat exchanger configured to receive the exhaust stream discharged from said combustion system, said at least one heat exchanger configured to transfer heat from the exhaust stream to the supercritical working fluid; and
   at least one turbine coupled to said turbocharger, said at least one turbine configured to receive the supercritical working fluid from said at least one heat exchanger, wherein said at least one turbine is further configured to extract useable work from the supercritical working fluid to drive the turbocharger.

5. The power generation system of claim 4, wherein said heat recovery system further comprises at least one compressor coupled to said at least one turbine, said at least one compressor is configured to compress the supercritical working fluid.

6. The power generation system of claim 5, wherein said heat recovery system further comprises at least one recuperator configured to transfer heat from a discharge of said at least one turbine to a discharge of said at least one compressor.

7. The power generation system of claim 6, said heat recovery system further comprises at least one cooler configured to cool the discharge of said at least one turbine.

8. A method of generating power using a power generation system, the power generation system including a combustion system, a heat recovery system, and a turbocharger, said method comprises:
    combusting a fuel with a flow of air to generate power and an exhaust stream using the combustion system;
    channeling the exhaust stream from the combustion system to the heat recovery system;
    heating a supercritical working fluid within the heat recovery system using the exhaust stream;
    driving the turbocharger using the heated supercritical working fluid;
    compressing a flow of compressed air using the turbocharger; and
    combusting the fuel with the flow of compressed air and an additional flow of air to generate power and the exhaust stream.

9. The method of claim 8, wherein combusting the fuel with the flow of air to generate power and the exhaust stream using the combustion system comprises combusting the fuel with the flow of air to generate power and the exhaust stream using a gas turbine engine.

10. The method of claim 8, wherein heating the supercritical working fluid within the heat recovery system using the exhaust stream comprises transferring heat from the exhaust stream to the supercritical working fluid using at least one heat exchanger.

11. The method of claim 8, wherein driving the turbocharger using the supercritical working fluid comprises extracting useable work from the supercritical working fluid to drive the turbocharger using a turbine.

12. The method of claim 11 further comprising cooling a discharge of the turbine with at least one cooler.

13. The method of claim 11 further comprising compressing the supercritical working fluid using a compressor coupled to the turbine.

14. The method of claim 13 further comprising transferring heat from a discharge of the turbine to a discharge of the compressor using at least one recuperator.

15. The method of claim 11 further comprising generating power from an auxiliary generator coupled to the turbine.

16. A heat recovery system for a power generation system, said heat recovery system comprising:
    at least one heat exchanger configured to receive an exhaust stream from a combustion system, said at least one heat exchanger configured to transfer heat from the exhaust stream to a supercritical working fluid; and
    at least one turbine coupled to at least one turbocharger, said at least one turbine configured to receive the supercritical working fluid from said at least one heat exchanger, wherein said at least one turbine is configured to extract useable work from the heated supercritical working fluid to drive the at least one turbocharger.

17. The heat recovery system of claim 16 further comprising at least one auxiliary generator coupled to said at least one turbine, wherein said at least one auxiliary generator is configured to generate power.

18. The heat recovery system of claim 16 further comprising at least one compressor coupled to said at least one turbine, wherein said at least one compressor is configured to compress the supercritical working fluid.

19. The heat recovery system of claim 18 further comprising at least one recuperator configured to transfer heat from a discharge of said at least one turbine to a discharge of said at least one compressor.

20. The heat recovery system of claim 19 further comprising at least one cooler configured to the discharge of said at least one turbine.

* * * * *